United States Patent
Hsu et al.

(10) Patent No.: US 8,200,192 B2
(45) Date of Patent: Jun. 12, 2012

(54) METHODS FOR PERFORMING PIN VERIFICATION BY MOBILE STATION WITH SUBSCRIBER IDENTITY CARDS AND SYSTEMS UTILIZING THE SAME

(75) Inventors: Chia-Chen Hsu, Taipei (TW); Chung-Ming Lin, Taichung (TW)

(73) Assignee: Mediatek Inc., Hsin-Chu (TW)

( * ) Notice: Subject to any disclaimer, the term of this patent is extended or adjusted under 35 U.S.C. 154(b) by 690 days.

(21) Appl. No.: 12/355,904

(22) Filed: Jan. 19, 2009

(65) Prior Publication Data

US 2009/0270072 A1 Oct. 29, 2009

Related U.S. Application Data

(60) Provisional application No. 61/047,143, filed on Apr. 23, 2008.

(51) Int. Cl.
*H04M 3/16* (2006.01)
(52) U.S. Cl. .......................................... 455/411; 455/10
(58) Field of Classification Search ........... 455/410–411
See application file for complete search history.

(56) References Cited

U.S. PATENT DOCUMENTS

| | | | | |
|---|---|---|---|---|
| 5,870,467 A * | 2/1999 | Imai et al. | ....................... | 705/57 |
| 6,556,820 B1 * | 4/2003 | Le et al. | ........................ | 455/411 |
| 7,278,576 B2 * | 10/2007 | Endo et al. | ............... | 235/462.15 |
| 7,698,688 B2 * | 4/2010 | Fujiwara et al. | .............. | 717/126 |
| 7,817,984 B2 * | 10/2010 | Ishikawa et al. | ............... | 455/405 |
| 2004/0180657 A1 * | 9/2004 | Yaqub et al. | ............... | 455/435.1 |
| 2005/0021940 A1 | 1/2005 | Ma | | |
| 2005/0164737 A1 | 7/2005 | Brown | | |
| 2005/0221801 A1 * | 10/2005 | Liu et al. | ....................... | 455/411 |
| 2006/0084472 A1 * | 4/2006 | Park | ..................... | 455/558 |
| 2006/0173991 A1 * | 8/2006 | Piikivi | ........................ | 709/224 |
| 2006/0175418 A1 | 8/2006 | Ho | | |
| 2007/0209041 A1 * | 9/2007 | Exley et al. | .................... | 719/328 |
| 2008/0086645 A1 * | 4/2008 | Uchiyama et al. | ........... | 713/184 |
| 2008/0113651 A1 * | 5/2008 | Choi | ........................... | 455/411 |
| 2008/0295159 A1 * | 11/2008 | Sentinelli | .......................... | 726/6 |
| 2009/0011739 A1 * | 1/2009 | Cofta | ........................... | 455/411 |
| 2009/0088211 A1 * | 4/2009 | Kim | .................... | 455/558 |

FOREIGN PATENT DOCUMENTS

JP  2002135407 A  *  5/2002

* cited by examiner

*Primary Examiner* — Kent Chang
*Assistant Examiner* — Magdi Elhag
(74) *Attorney, Agent, or Firm* — Thomas|Kayden

(57) ABSTRACT

A method for performing personal identification number verification by a mobile station with a first subscriber identity card and a second subscriber identity card, executed by a processor of the mobile station, is provided. A single input code is received. The first subscriber identity card and the second subscriber identity card are verified according to the input code. A result indicating that the first subscriber identity card and the second subscriber identity card have been successfully verified is stored when the input code is correct.

17 Claims, 12 Drawing Sheets

| Card | Card Identity | PIN |
|---|---|---|
| 1st Card | $ICCID_1$ | $PIN_1$ |
| 2nd Card | $ICCID_2$ | $PIN_2$ |

METHODS FOR PERFORMING PIN VERIFICATION BY MOBILE STATION WITH SUBSCRIBER IDENTITY CARDS AND SYSTEMS UTILIZING THE SAME

CROSS REFERENCE TO RELATED APPLICATIONS

This application claims the benefit of U.S. Provisional Application No. 61/047,143, filed on Apr. 23, 2008, the entirety of which is incorporated by reference herein.

BACKGROUND OF THE INVENTION

1. Field of the Invention

The invention relates to a method for performing personal identification number (PIN) verification by a mobile station, and more particularly to a method for performing PIN verification by a mobile station with multiple subscriber identity cards.

2. Description of the Related Art

Currently, the Global System for Mobile communication (GSM) standard is the popular standard for mobile phones in the world. The GSM standard, standardized by the European Telecommunication Standards Institute (ETSI) is a cellular network structure and a Time Division Multiple Access (TDMA) system. For a carrier frequency, the TDMA system will divide a frame into eight time slots, wherein each time slot is used to transmit a channel data for a subscriber. In addition, the General Packet Radio Service (GPRS) technology is one of the available technologies of a GSM system. The GPRS technology utilizes the unused channels in the GSM system to provide moderate speed data transmission. The Wideband Code Division Multiple Access (W-CDMA) is a wideband spread-spectrum mobile air interface that utilizes the direct-sequence spread spectrum method of asynchronous code division multiple access to achieve higher speeds and support more users compared to the implementation of time division multiplexing (TDMA) used by GSM systems. Time Division-Synchronous Code Division Multiple Access (TD-SCDMA) is another type of 3G mobile telecommunications standard.

A dual SIM mobile phone is a phone with two Subscriber Identity Modules (SIMs), which correspond to different telephone numbers. The dual SIM mobile phone allows a user to use two communication services without carrying two phones at the same time. For example, the same mobile phone may be used for business and private use with separate numbers and bills, thus providing convenience to mobile phone users.

BRIEF SUMMARY OF THE INVENTION

Methods for performing PIN verification by a mobile station with a first subscriber identity card and a second subscriber identity card and the systems utilizing the same are provided. An exemplary embodiment of a method for performing PIN verification by a mobile station with a first subscriber identity card and a second subscriber identity card, executed by a processor of the mobile station, is provided. A single input code is received. The first subscriber identity card and the second subscriber identity card are verified according to the input code. A result indicating that the first subscriber identity card and the second subscriber identity card have been successfully verified is stored when the input code is correct.

Moreover, an exemplary embodiment of a system for performing PIN verification is provided. The system comprises a first subscriber identity card, a second subscriber identity card and a processor. The processor receives a single input code. The processor verifies the first subscriber identity card and the second subscriber identity card according to the input code. The processor stores a result indicating that the first subscriber identity card and the second subscriber identity card have been successfully verified when the input code is correct.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
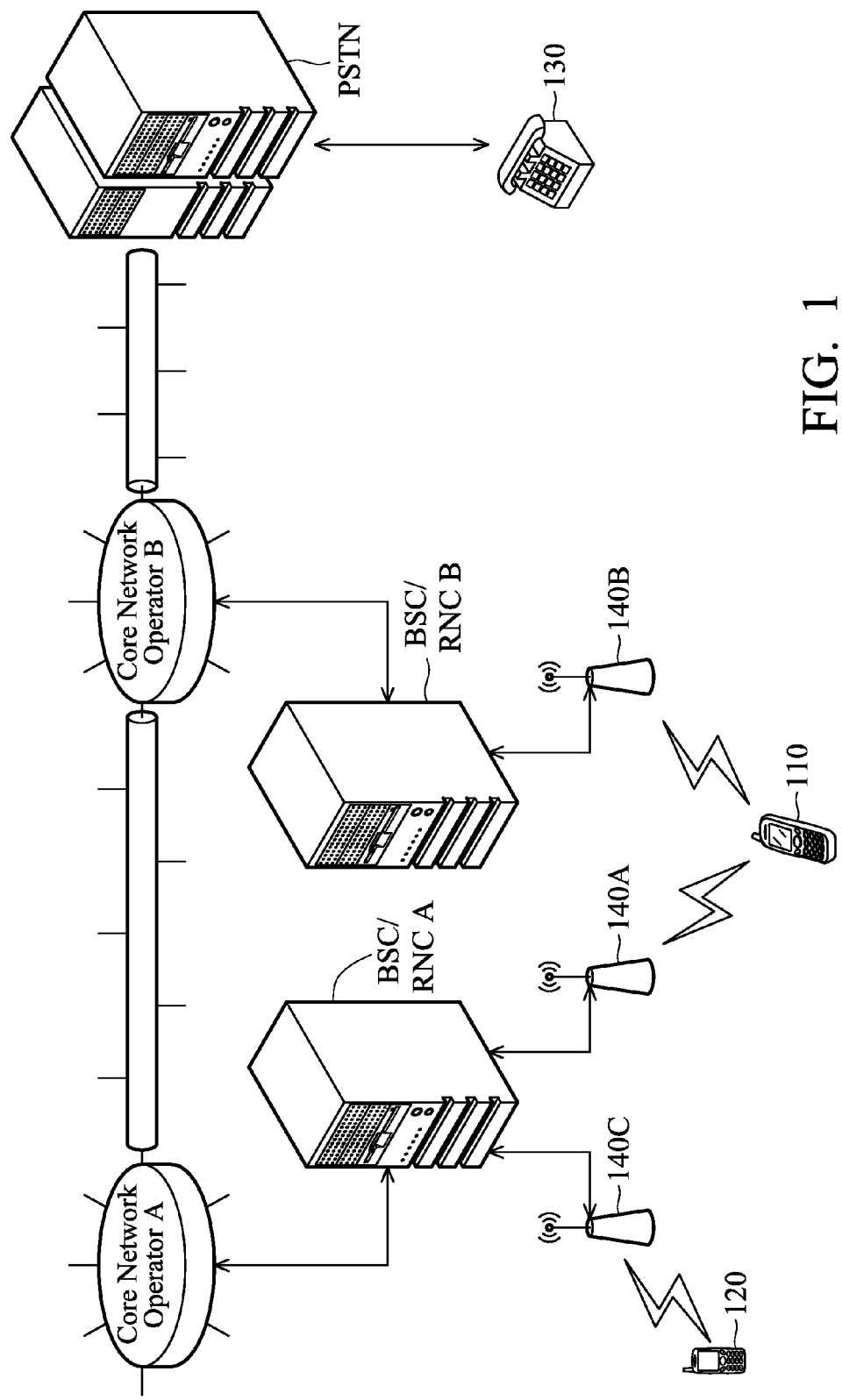
FIG. 1 shows a schematic diagram of a mobile communication network system.

The following description is of the best-contemplated mode of carrying out the invention. This description is made for the purpose of illustrating the general principles of the invention and should not be taken in a limiting sense. The scope of the invention is best determined by reference to the appended claims.

A subscriber identity module (SIM) card typically contains user account information, an international mobile subscriber identity (IMSI) and a set of SIM application toolkit (SAT) commands and provides storage space for phone book contacts. A micro-processing unit (MCU) of the Baseband chip (simply referred to as a Baseband MCU hereinafter) may interact with MCUs of the SIM cards (each simply referred to as a SIM MCU hereinafter) to fetch data or SAT commands from the plugged in SIM cards. A mobile station (MS) is immediately programmed after plugging in the SIM card. SIM cards may also be programmed to display custom menus for personalized services.

A universal SIM (USIM) card is inserted into a mobile station for universal mobile telecommunications system (UMTS) or Time Division-Synchronous Code Division Multiple Access (TD-SCDMA) system (also called 3G) telephony communication. The USIM card stores user account information, an IMSI, authentication information and a set of USIM Application Toolkit (USAT) commands and provides storage space for text messages and phone book contacts. A Baseband MCU may interact with an MCU of the USIM card (each simply referred to as a USIM MCU hereinafter) to fetch data or SAT commands from the plugged in USIM cards. The phone book on the USIM card is greatly enhanced when compared to the SIM card. For authentication purposes, the USIM card may store a long-term preshared secret key K, which is shared with the Authentication Center (AuC) in the network. The USIM MCU may verify a sequence number that must be within a range using a window mechanism to avoid replay attacks, and is in charge of generating the session keys CK and IK to be used in the confidentiality and integrity algorithms of the KASUMI (also termed A5/3) block cipher in the UMTS. A mobile station is immediately programmed after plugging in the USIM card.

A removable User Identity Module (R-UIM) or a Code Division Multiple Access (CDMA) Subscriber Identity Module (CSIM) card has already been developed for a CDMA mobile station and is equivalent to the GSM SIM and 3G USIM except that it is capable of working in CDMA networks. The R-UIM or the CSIM card is physically compatible with the GSM SIM card, and provides similar security mechanisms for the CDMA system.

The International Mobile Subscriber Identity (IMSI) is a unique number associated with a global system for mobile communication (GSM) or a universal mobile telecommunications system (UMTS) network user. The IMSI may be sent by a mobile station to a GSM or UMTS network to acquire other details of the mobile user in the Home Location Register (HLR) or as locally copied in the Visitor Location Register (VLR). An IMSI is typically 15 digits long, but may be shorter (for example MTN South Africa's IMSIs are 14 digits). The first 3 digits are the Mobile Country Code (MCC), and they are followed by the Mobile Network Code (MNC), which is either 2 digits (European standard) or 3 digits (North American standard). The remaining digits are the mobile subscriber identification number (MSIN) for a GSM or UMTS network user.

FIG. 1 shows a schematic diagram of a mobile communication network system. In FIG. 1, a mobile station (may be called user equipment interchangeably) 110 with dual subscriber identity cards A and B may simultaneously access two core networks such as a Global System for Mobile Communications (GSM), Wideband Code Division Multiple Access (WCDMA), CDMA 2000 and Time Division-Synchronous Code Division Multiple Access (TD-SCDMA) network and the like after camping on two cells 140A and 140B (i.e. each may be a base station, a node-B or others). The subscriber identity card A or B may be a SIM, USIM, R-UIM or CSIM card. The mobile station 110 may make a voice or data call to a called party 120 or 130 through the GSM system with the Base Station Controller (BSC), WCDMA/CDMA2000/TD-SCDMA network with Radio Network Controller (RNC), Public Switched Telephone Network (PSTN) or any combinations thereof using either of the subscriber identity cards A or B. For example, the mobile station 110 may make a voice call with the subscriber identity card A to the called party 120 through the cell 140A, an BSC/RNC A and a cell 140C in sequence, or make a voice call with the subscriber identity card B to the called party 120 through the cell 140B, an BSC/RNC B, a core network operator B, a core network operator A, the BSC/RNC A and the cell 140C in sequence. Moreover, the mobile station 110 may receive a phone call request with either of the subscriber identity cards A or B from the calling party 120 or 130. For example, the mobile station 110 may receive a phone call request to the subscriber identity card B from the calling party 130 via a Public Switched Telephone Network (PSTN), the core network operator B, the BSC/RNC B and the cell 140B.

Figure 2A:
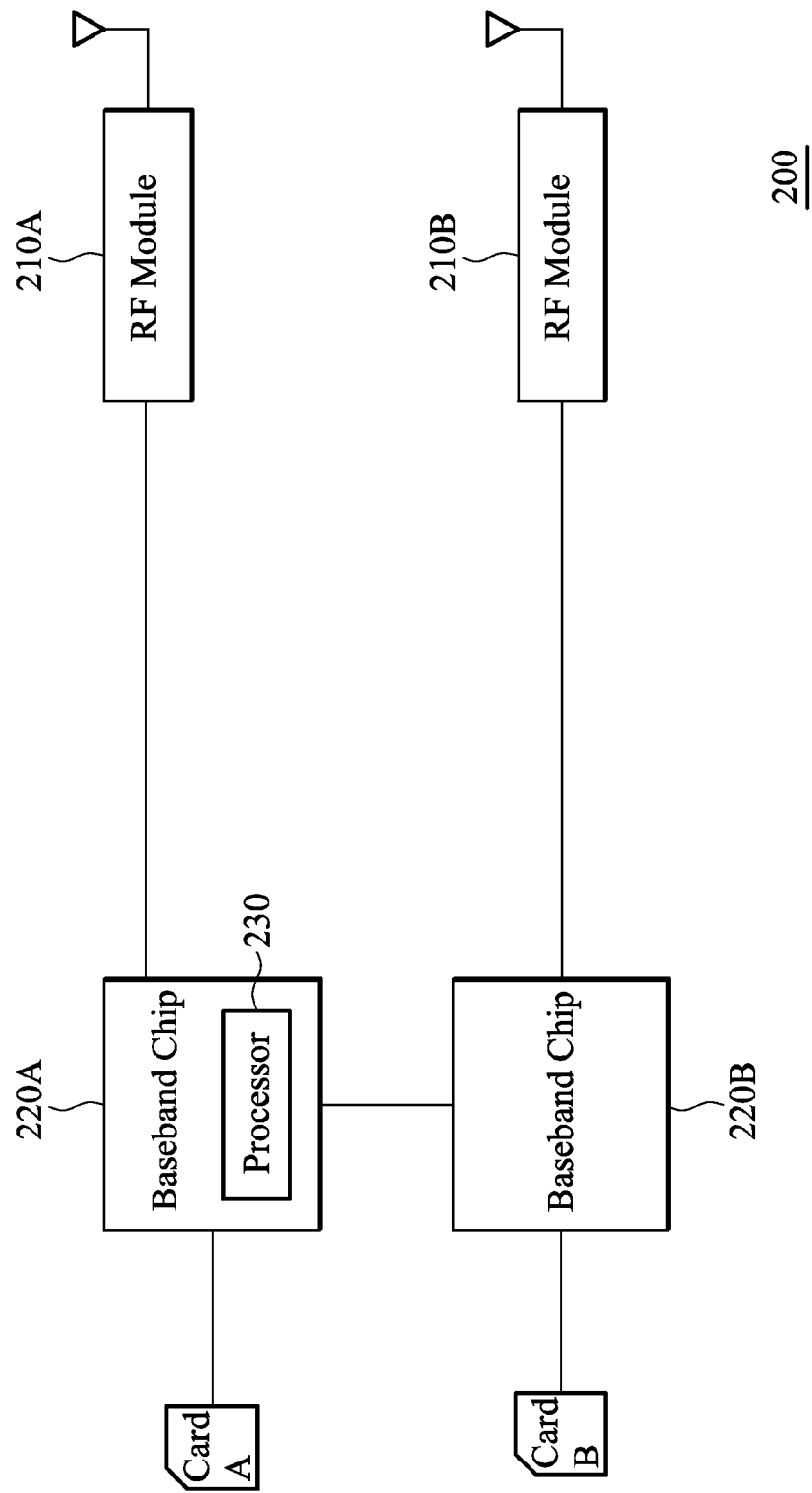
FIG. 2A shows a mobile station according to an embodiment of the invention.

FIG. 2A shows the hardware architecture of a mobile station 200 according to an embodiment of the invention. The mobile station 200 comprises two radio frequency (RF) modules 210A and 210 B and two Baseband chips 220A and 220B, wherein the RF module 210A is coupled to the Baseband chip 220A and the RF module 210B is coupled to the Baseband chip 220B. Two subscriber identity cards A and B may be plugged into two sockets of the mobile station 200 connecting to the Baseband chips 220A and 220B, respectively. Each of the subscriber identity cards A and B may be a SIM, USIM, R-UIM or CSIM card, which is provided by a particular network operator. The mobile station 200 can therefore simultaneously camp on two cells (base stations) provided by either the same network operator or different network operators for the plugged in cards A and B and operate in stand-by/idle modes, or even dedicated modes, using different RF modules and Baseband chips. Each of the Baseband chips 220A and 220B may read data from a particular subscriber identity card A or B and write data to the subscriber identity card A or B. Furthermore, the Baseband chip 220A may be a master device for the mobile station 200, and the Baseband chip 220A comprises a processor 230 for controlling the communications between the subscriber identity cards A and B and the RF modules 210A and 210 B. A further processor (not shown) may be provided in the Baseband chip 220B to coordinately operate with the processor 230 of the Baseband 220A to improve performance.

Figure 2B:
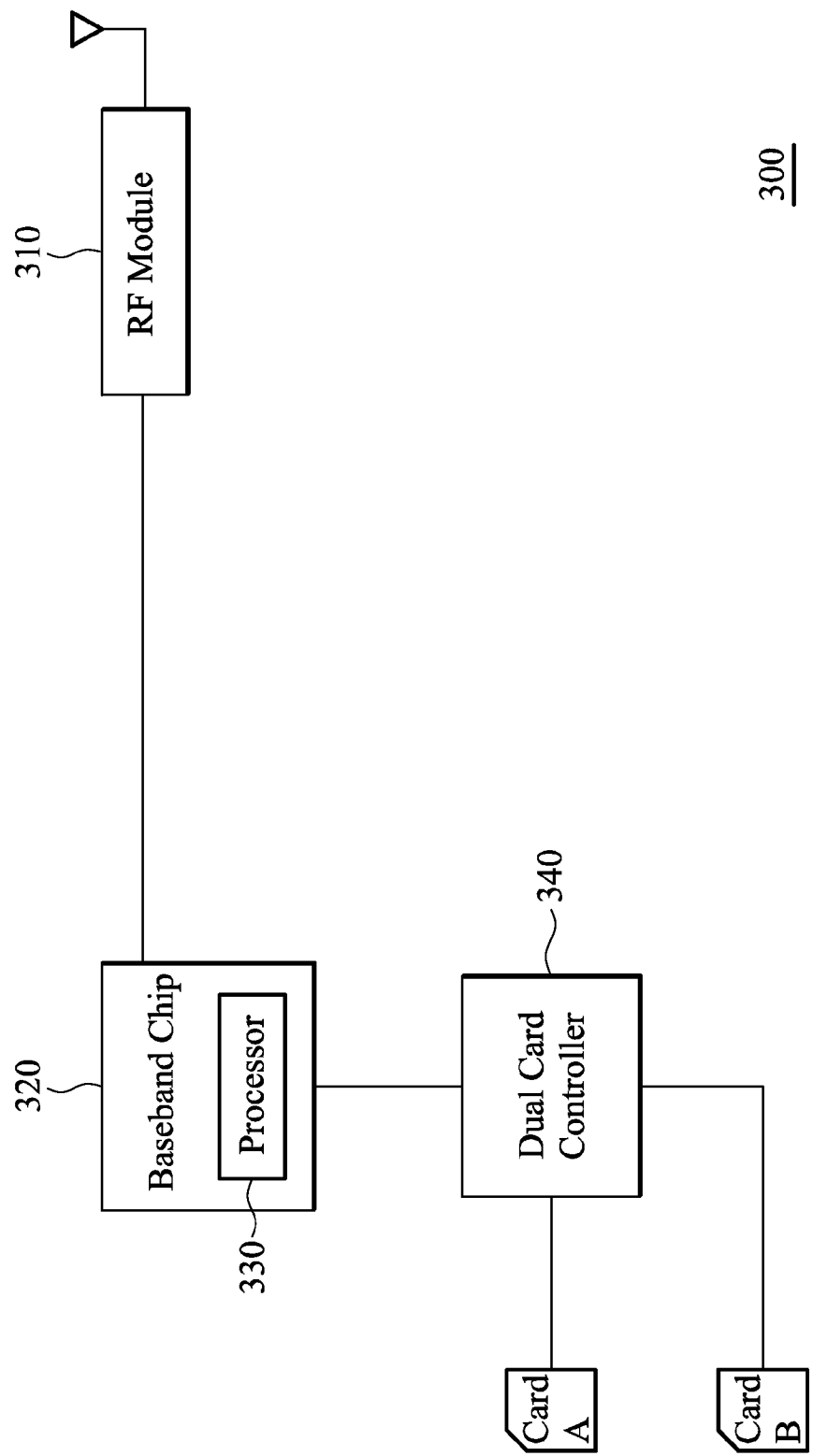
FIG. 2B shows a mobile station according to another embodiment of the invention.

FIG. 2B shows the hardware architecture of a mobile station 300 according to another embodiment of the invention. The mobile station 300 comprises an RF module 310, a Baseband chip 320 and a dual card controller 340, wherein the two subscriber identity cards A and B may be plugged into two sockets of the mobile station 300 connecting to the dual card controller 340. Those skilled in the art may practice the dual card controller 340 in the Baseband chip 320. Each of the subscriber identity cards A and B may be a SIM, USIM, R-UIM or CSIM card, which is provided by a particular network operator. The mobile station 300 may therefore camp on two cells provided by either the same network operator or different network operators for the plugged in cards A and B and operate in stand-by/idle modes, or even dedicated modes, using the same RF module and Baseband chip. The dual card controller 340 is coupled/connected between the Baseband chip 320 and the subscriber identity cards A and B. Furthermore, the Baseband chip 320 comprises a processor 330 for controlling the communications between the subscriber identity cards A and B and the RF module 310. Moreover, the processor 330 of the Baseband chip 320 may read data from the subscriber identity card A or B via the dual card controller 340, and may also write data to the subscriber identity card A or B via the dual card controller 340.

An RF module (e.g. 210A or 210B of FIG. 2A, or 310 of FIG. 2B) receives wireless radio frequency signals, converts the received signals to baseband signals to be processed by a corresponding Baseband chip (e.g. 220A or 220B of FIG. 2A, or 320 of FIG. 2B), or receives baseband signals from the Baseband chip and converts the received signals to wireless radio frequency signals to be transmitted to a peer device. The RF module may comprise a plurality of hardware devices to perform radio frequency conversion. For example, the RF module may comprise a mixer to multiply the baseband signals with a carrier oscillated in the radio frequency of the wireless communication system, wherein the radio frequency may be, for example, 900 MHz or 1800 MHz for a global system for mobile communication (GSM), or 1900 MHz or 2100 MHz for a Universal Mobile Telecommunications System (UMTS). The Baseband chip further converts the baseband signals to a plurality of digital signals, and processes the digital signals, and vice versa. The Baseband chip may also comprise a plurality of hardware devices to perform baseband signal processing. The baseband signal processing may comprise analog to digital conversion (ADC), digital to analog conversion (DAC), gain adjustments, modulation/demodulation, encoding/decoding, and so on.

As the mobile station equipped with two or more subscriber identity cards as shown in FIG. 2A or FIG. 2B, the mobile station can be operated in an idle mode and dedicated mode for each inserted subscriber identity card. Referring to FIG. 1, in an idle mode, the mobile station 110 is either powered off, searches for or measures the Broadcast Control Channel (BCCH) with better signal quality from a base station (e.g. the cell 140A or 140B) provided by a specific network operator, or is synchronized to the BCCH of a specific base station to be ready to perform a random access procedure on the Random Access Channel (RACH) to request a dedicated channel. In a dedicated mode, the mobile station 110 occupies a physical channel and tries to synchronize therewith, and establishes logical channels and switches throughout them.

Specifically, for each inserted subscriber identity card in the idle mode, the mobile station 110 continuously listens to the BCCH from a base station and reads the BCCH information and conducts periodic measurements of the signaling strength of the BCCH carriers in order to select a suitable cell to be camped on. In the idle mode, no exchange of signaling messages is presented with the network. The data required for Radio Resource Management (RR) and other signaling procedures is collected and stored, such as the list of neighboring BCCH carriers, thresholds for RR algorithms, Common Control Channel (CCCH) configurations, information regarding the use of RACH and Paging channel (PCH), or others. Such kind of information (e.g. system information (SI)) is broadcasted by a base station system on the BCCH and provides information about the network configuration. Moreover, the SI is available for all mobile stations currently in the cell. The SI comprises a Public Land Mobile Network (PLMN) code uniquely owned by a network operator. The PLMN code comprising a Mobile Country Code (MCC) and a Mobile Network Code (MNC), indicating which network operator is providing the communication services. In addition, a cell identity (ID) indicating which cell is broadcasting the BCCH is also contained in the SI. Furthermore, the SI may comprise network identification, neighboring cells, channel availability and power control requirements etc. The PLMN code may be acquired and stored in a corresponding subscriber identity card of the electronic device upon receiving the SI from the BCCH. The Base Station System (BSS) further continuously sends out, on all PCHs of a cell valid Layer 3, messages (PAGING REQUEST) which the mobile station 110 can decode and recognize if its address (e.g. its IMSI of a specific SIM card) is paged. The mobile station 110 periodical monitors the PCHs to avoid loss of paging calls.

Each exchange of signaling messages with the network, e.g. BSS, Mobile Switching Center (MSC) and the similar, requires an Radio Resource Management (RR) connection and the establishment of an LAPDm connection between a mobile station and BSS. Setting up the RR connection can be initiated by the mobile station or network. In either situation, the mobile station sends a channel request (CHAN-QUEST) on the RACH in order to get a channel assigned on the Access Grant Channel (AGCH), also referred to as an immediate assignment procedure. The channel request may be rejected by an immediate assignment reject procedure. If the network does not immediately answer to the channel request, the request is repeated for a certain number of times. In the situation of a network-initiated connection, a procedure is preceded by a paging call (PAGING REQUEST) to be answered by the mobile station (PAGING RESPONSE). After an RR connection has been successfully completed, higher protocol layers, Connection Management (CM) and Mobility Management (MM) can receive and transmit signaling messages.

In contrast to the setup of connections, the release is typically initiated by the network (CHANNEL RELEASE). The release may occur when the signaling transaction ends, there are too many errors, or the channel is removed due to a higher priority call, e.g. an emergency call, or end of a call.

Once an RR connection has been set up, the mobile station has either a Stand-alone Dedicated Control Channel (SDCCH) or a Traffic Channel (TCH) with associated Slow/Fast Associated Control Channel (SACCH/FACCH) available for exclusive bidirectional use.

Setting up an MM connection from the mobile station presumes the existence of an RR connection, but a single RR connection can be used by multiple MM connections. If the MM connection can be established, the mobile station sends the message CM-SERVICE REQUEST to the network. The message CM-SERVICE REQUEST contains information regarding a mobile subscriber (IMSI or Temporary Mobile Subscriber Identity (TMSI)), where a TMSI has only local significance within a Location Area and must be used together with the Location Area Identity (LAI) for the unique identification of a subscriber, as well as information regarding the requested service (outgoing voice call, short message service SMS transfer, activation or registration of a supplementary service, or others). If the mobile station receives the message CM-SERVICE ACCEPT or local message from the RR sub-layer that enciphering has been activated, it is treated as an acceptance of the service request, and the requesting CM entity is informed about the successful setup of an MM connection. Otherwise, if the service request has been rejected by the network, the mobile station receives a message CM-SERVICE REJECT, and the MM connection cannot be established.

The mobile station equipped with two or more inserted subscriber identity cards as shown in FIG. 2A or FIG. 2B, can be operated in an idle mode and connected mode for each inserted subscriber identity card, wherein the inserted subscriber identity cards are USIM cards. Referring to FIG. 1, in an idle mode, the mobile station selects (either automatically or manually) a PLMN to contact. The mobile station continuously listens to the BCCH to acquire an SI comprising a PLMN code uniquely owned by a network operator. The PLMN code comprising an MCC and an MNC, indicates which network operator is providing communication services. In addition, an ID indicating which cell is broadcasting the BCCH is also contained in the SI. The PLMN code may be acquired and stored in a corresponding USIM card of the electronic device upon receiving the SI from the BCCH. The mobile station searches for a suitable cell of the chosen PLMN, chooses that cell to provide available services, and tunes to its control channel, also referred to as "camping on a cell". After camping on a cell in an idle mode, the mobile station can receive system information and cell broadcast messages from a node-B (e.g. the cell 140A or 140B). The mobile station stays in an idle mode until the node-B transmits a request to establish a Radio Resource Control (RRC) connection. In the idle mode, the mobile station is identified by non-access stratum identities such as IMSI, TMSI and Packet-TMSI (P-TMSI).

In the Cell_DCH state of a connected mode, a dedicated physical channel is allocated to the mobile station, and the mobile station is known by its serving radio network controller (RNC) on a cell or active set level. The mobile station performs measurements and sends measurement reports according to measurement control information received from RNC. The mobile station with certain capabilities monitors the Forward Access Channel (FACH) for system information messages. In the Cell_FACH state of a connected mode, no dedicated physical channel is allocated for the mobile station, but a Random Access Channel (RACH) and FACH are used instead, for transmitting both signaling messages and small amounts of user plane data. In this state, the mobile station also listens to the Broadcast Channel (BCH) to acquire system information. The mobile station performs cell reselections, and after a reselection the mobile station typically sends a Cell Update message to the RNC, so that the RNC knows the mobile station location on a cell level. In the Cell_PCH state of a connected mode, the mobile station is known on a cell level in a Serving Radio Network Controller (SRNC), but the mobile station can be reached only via the Paging Channel (PCH). The URA_PCH state of a connected mode is very similar to the Cell_PCH state, except that the mobile station does not execute Cell Update after each cell reselection procedure, but instead reads the UMTS Terrestrial Radio Access Network (UTRAN) Registration Area (URA) identities from the BCH, and only if the URA changes (after cell reselection) does the mobile station inform its location to the SRNC. The mobile station leaves the connected mode and returns to the idle mode when the RRC connection is released or following RRC connection failure.

The establishment of an RRC connection and Signaling Radio Bearers (SRB) between a mobile station and UTRAN (RNC) is initiated by a request from higher layers (non-access stratum) on the mobile station side. In a network-originated case, the establishment is preceded by an RRC Paging message. The UTRAN (RNC) may respond with an RRC Connection Set-up message including a dedicated physical channel assignment for the mobile station (move to the Cell-FACH state), or a command to instruct the mobile station to use common channels (move to the Cell_FACH state).

A personal identification number (PIN) is a secret numeric password shared between a user and a subscriber identity card, that can be used by the subscriber identity card to authenticate the user. Upon receiving an input number, the mobile station looks up the PIN code thereof and compares the looked-up PIN code with the received input. The user is granted access only when the entered number matches with the PIN code stored in the subscriber identity card. It is to be understood that a PIN verification for a subscriber identity card can be disabled by a user.

Figure 3:
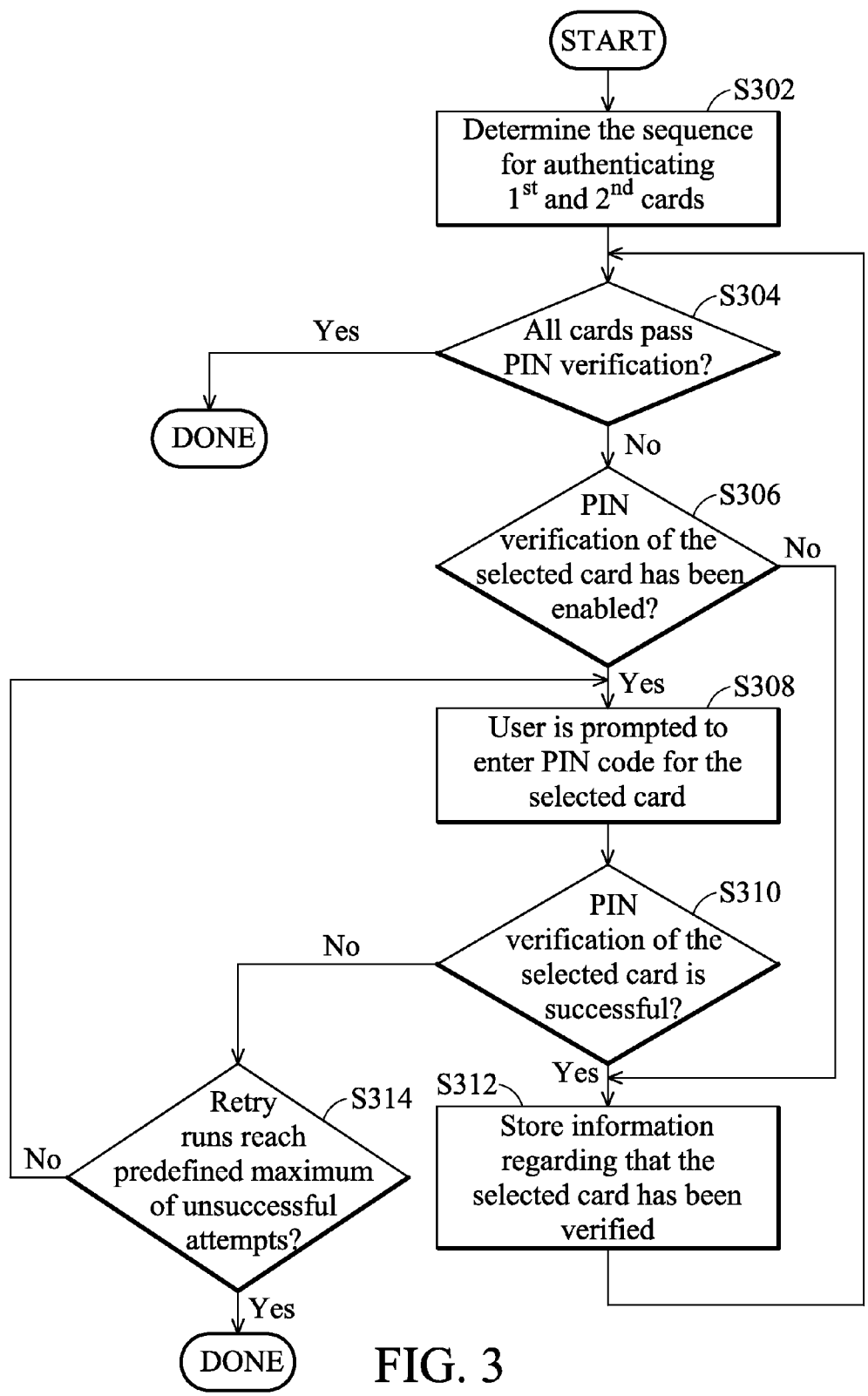
FIG. 3 shows a flow chart illustrating a method for performing a normal PIN verification procedure by a mobile station with a first subscriber identity card and a second subscriber identity card according to an embodiment of the invention.

FIG. 3 shows a flow chart illustrating a method for performing a normal PIN verification procedure by a mobile station with a first subscriber identity card and a second subscriber identity card, being performed when executing software/firmware code by a processor of the mobile station (e.g. 220A or 220B of FIG. 2A, or 320 of FIG. 2B), according to an embodiment of the invention. Using the first and second subscriber identity cards as an example, the sequence for authenticating the two cards is first determined (step S302). Next, it is determined whether each subscriber identity card has passed the PIN verification procedure (step S304). If not, it is determined whether the PIN verification procedure for the selected subscriber identity card has been enabled (step S306). If not, information regarding the selected subscriber identity card has been verified is stored (step S 312). If so, a PIN code for the selected subscriber identity card is requested (step S308). The PIN code may be provided by a user with facilitation of a man-machine interface (MMI). Next, it is determined whether the PIN verification is successful by determining whether the provided PIN code is correct (step S310). Accuracy of the provided PIN code may also mean that the provided PIN code is the same as that preset by a network operator or a user. If the provided PIN code is correct, information regarding the selected subscriber identity card has been successfully verified is stored and the number of remaining PIN attempts for that subscriber identity card is reset to its initial value, for example 3, which represents the maximum of unsuccessful attempts (step S312). Note that, the initial value may be configured to a greater or smaller number according to system requirements. If the provided PIN code is false, the number of remaining PIN attempts for the selected subscriber identity card is decremented by one. It is to be understood that the number of remaining PIN attempts may be stored in a non-volatile storage device of the mobile station, or the selected subscriber identity card. Next, it is determined whether the number of remaining PIN attempts has reached a predefined number, for example zero (step S314). If so (for example, after 3 consecutive false PIN attempts), the selected subscriber identity card is blocked until the UNBLOCK PIN function is successfully performed. In this case, for a blocked subscriber identity card, users are only allowed access to limited services, such as making emergency calls. Meanwhile, when enabling the PIN verification for all subscriber identity cards, the processor may consume more time and power to perform user authentication for all subscriber identity cards.

Figure 4:
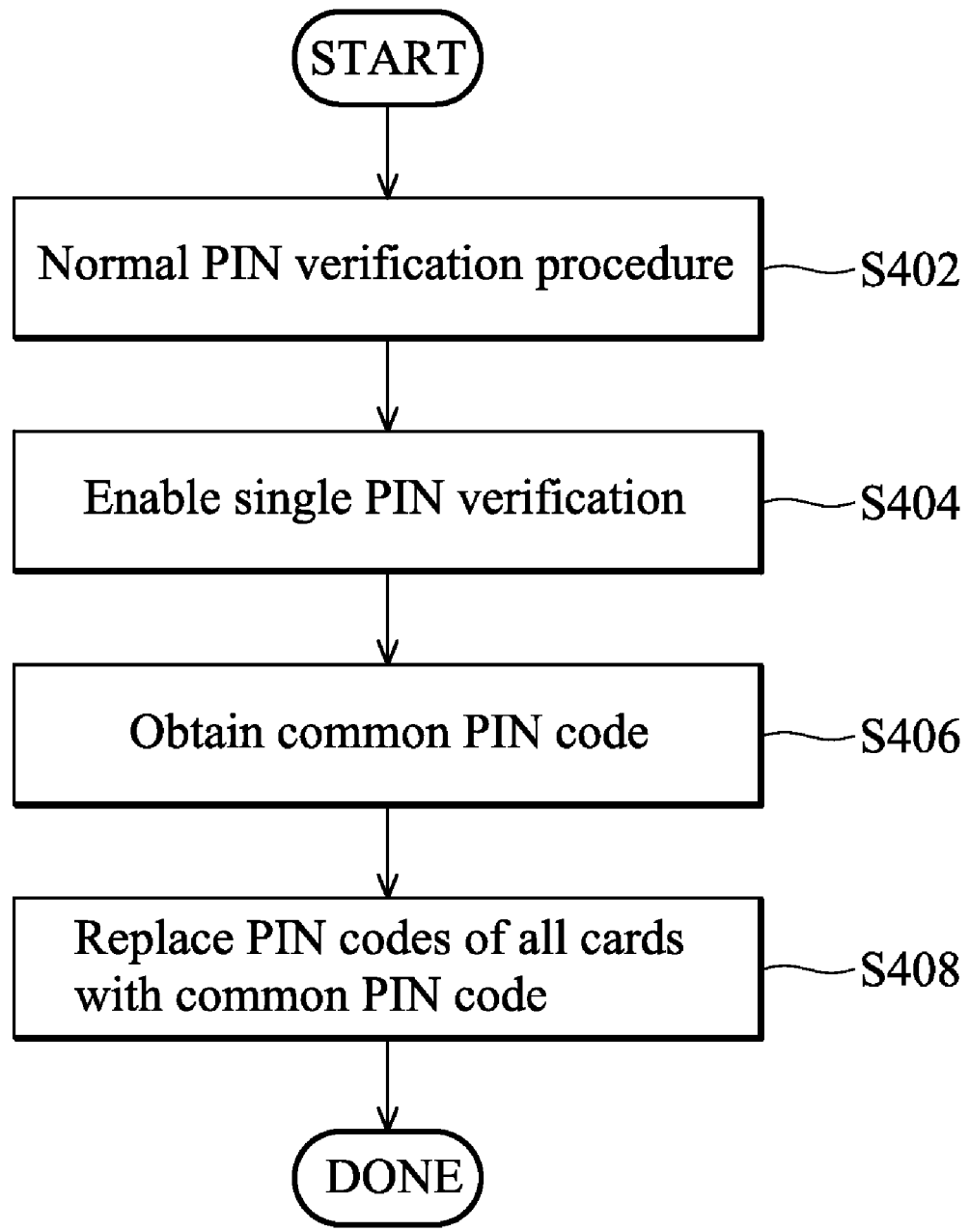
FIG. 4 shows a flow chart illustrating a method for enabling a single PIN verification according to an embodiment of the invention.

In order to reduce verification time and power consumption, an embodiment of the invention may be introduced to invite a common PIN code from a user and replace original PIN codes of the inserted identity cards with the newly invited common PIN code. Subsequently, only the common PIN code is required to be verified, instead of separately verifying all PIN codes of the inserted subscriber identity cards using two or more PIN verification loops with excessive user interactions, as shown in FIG. 3. FIG. 4 shows a flow chart illustrating a method for enabling a single PIN verification according to an embodiment of the invention. After successfully passing the normal PIN verification procedure as shown in FIG. 3 (step S402), a user may enable a single PIN verification (step S404). After that, a common PIN code provided by the user is obtained (step S406), and then the PIN codes of all subscriber identity cards are replaced with the common PIN (step S408). It is to be understood that the original PIN code for each subscriber identity card may be stored in a non-volatile storage device of the mobile station, or the corresponding subscriber identity card. Such enabling of the single PIN verification and inputting of a common PIN may be achieved during interaction with an MMI by the user. The MMI may force the user to type the common PIN code twice to prevent mistyping.

Figure 5:
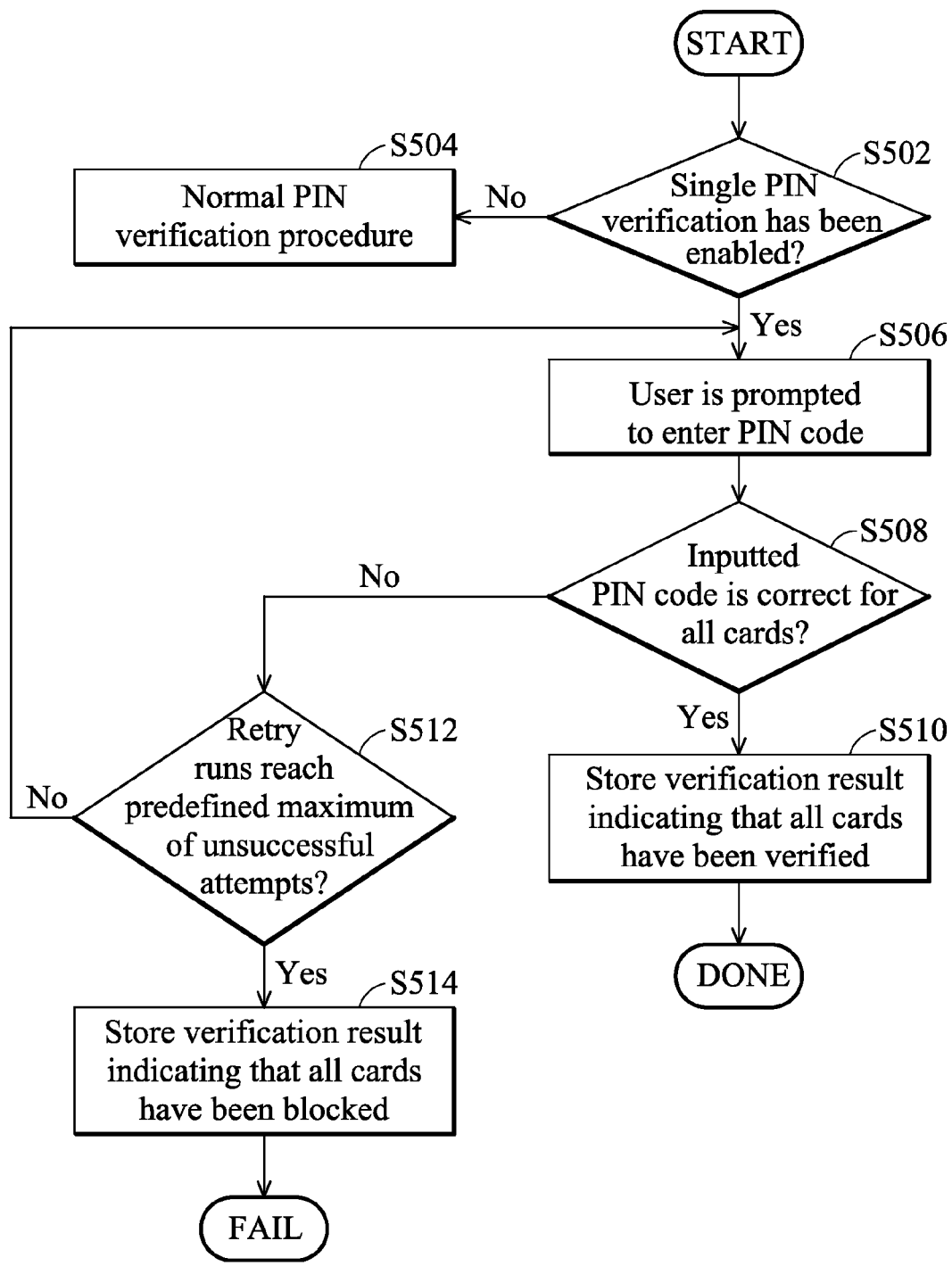
FIG. 5 shows a flow chart illustrating a method for performing a hybrid PIN verification by a mobile station with a first subscriber identity card and a second subscriber identity card according to an embodiment of the invention.

Accompanying with the flow chart as shown in FIG. 4, FIG. 5 shows a flow chart illustrating a method for performing a hybrid PIN verification by a mobile station with a first subscriber identity card and a second subscriber identity card, being performed when executing software/firmware code by a processor of the mobile station (e.g. 220A or 220B of FIG. 2A, or 320 of FIG. 2B), according to an embodiment of the invention. First, it is determined whether the single PIN verification has been enabled (step S502). If not, the normal PIN verification procedure shown in FIG. 3 is subsequently performed (step S504). If so, a single PIN verification procedure is performed, wherein the single PIN verification procedure begins to prompt a user to enter a PIN code for authentication (step S506). Thereafter, it is determined whether the inputted PIN code is correct for both PIN codes of the first and second subscriber identity cards (step S508). If the inputted PIN code is correct, a verification result indicating that the first and second subscriber identity cards have been successfully verified is stored (step S510). Simultaneously, a number of remaining PIN attempts for the first and second subscriber identity cards is reset to their initial values, for example 3, which represents the maximum of unsuccessful attempts. Note that, the initial value may be configured to a greater or smaller number according to system requirements. If the provided common PIN code is false, the number of remaining PIN attempts for the first and second subscriber identity cards is decremented by one. It is to be understood that the number of remaining PIN attempts may be stored in a non-volatile storage device or the subscriber identity cards of the mobile station. Next, it is determined whether the number of remaining PIN attempts has reached a predefined number, for example zero (step S512). If so (for example, after 3 consecutive false common PIN attempts), a verification result indicating that the first and second subscriber identity cards have been blocked is stored (step S514), wherein any of the first and second subscriber identity cards is blocked until the corresponding UNBLOCK PIN function is successfully performed.

Figures 6, 7:
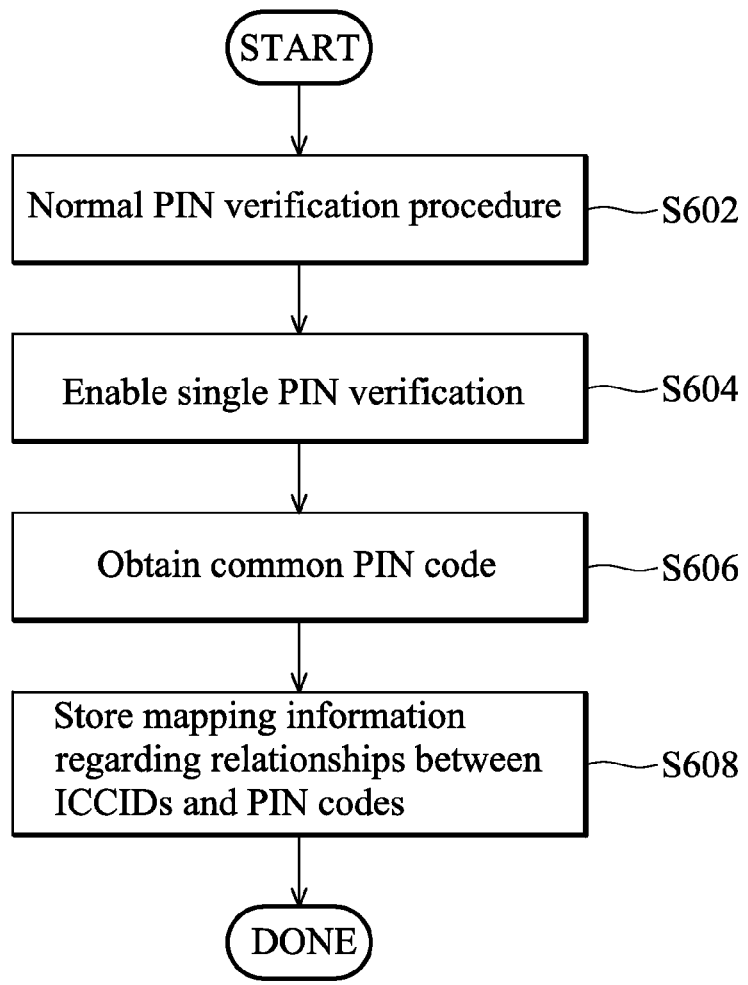
FIG. 6 shows a flow chart illustrating a method for enabling a single PIN verification according to another embodiment of the invention.
FIG. 7 shows a look-up table of mapping information regarding a relationship between integrated circuit card identity (ICCID) and PIN code.

In order to reduce verification time and power consumption, another embodiment of the invention may be introduced to invite a common PIN code from a user, and once providing the common PIN code, store the common PIN code, and mappings between integrated circuit card identities (ICCIDs) and the PIN codes of the subscriber identity cards in a non-volatile storage device of the mobile phone. Subsequently, only the common PIN code is required to be verified, and once the common PIN code is verified, original PIN codes of the non-volatile storage device are automatically fetched and provided to the currently inserted subscriber identity cards, thereby avoiding separately verifications of all PIN codes of the inserted subscriber identity cards using two or more PIN verification loops with excessive user interactions, as shown in FIG. 3. FIG. 6 shows a flow chart illustrating a method for enabling a single PIN verification according to another embodiment of the invention. After successfully passing the normal PIN verification procedure shown in FIG. 3 (step S602), a user may enable the single PIN verification (step S604). After that, a common PIN code provided by the user is obtained (step S606) and stored in a non-volatile storage device of the mobile station when the single PIN verification is enabled. Subsequently, for each subscriber identity card, the mapping information regarding a relationship between the printed integrated circuit card identity (ICCID) and the PIN code thereof is stored (step S608). Such enabling of the single PIN verification and inputting of the common PIN code may be achieved during interaction with an MMI by the user. The MMI may force the user to type the common PIN code twice to prevent mistyping. The mapping information may be implemented in a look-up table as shown in FIG. 7 and stored in a non-volatile storage device of the mobile station.

Figure 8:
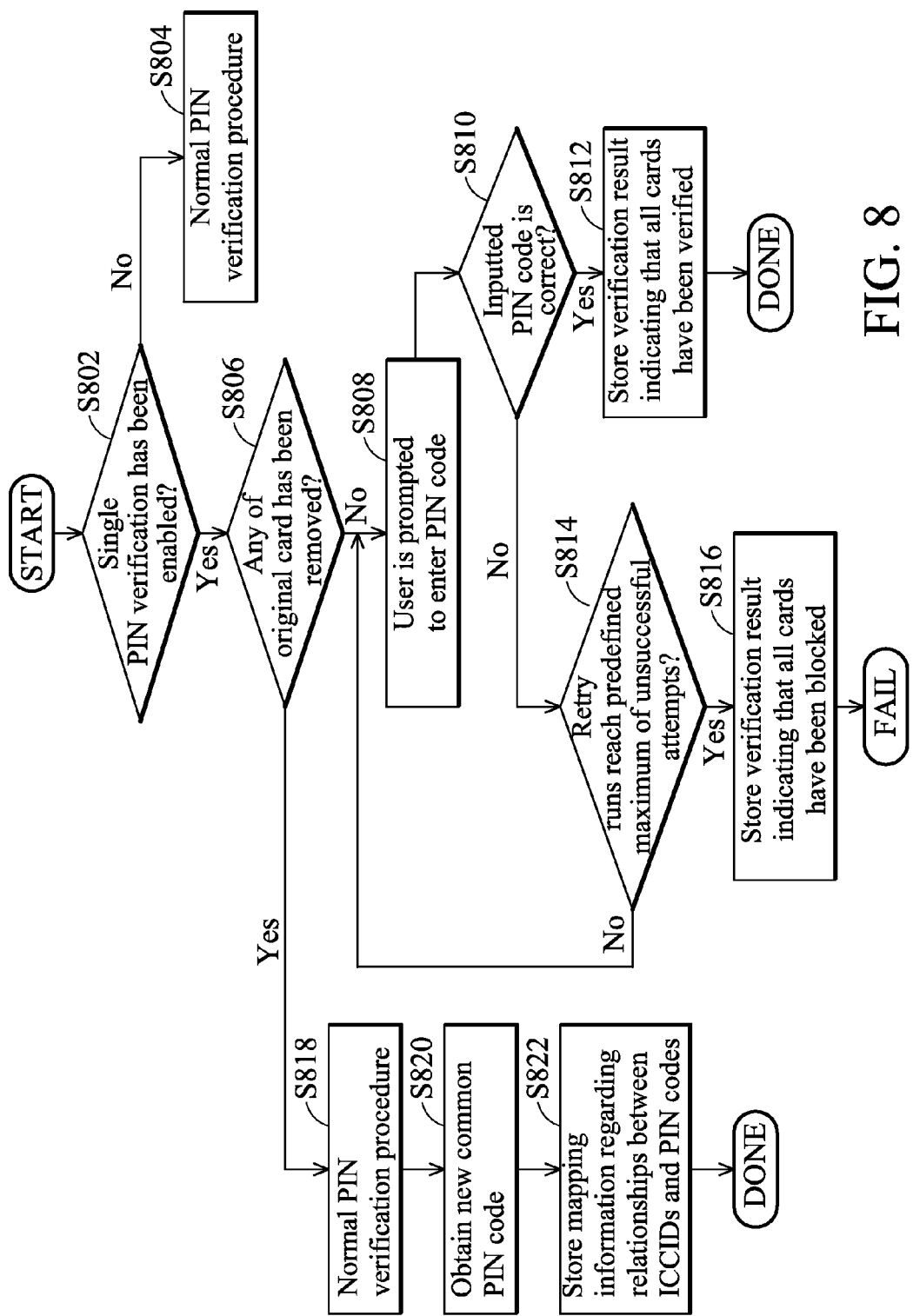
FIG. 8 shows a flow chart illustrating a method for performing a hybrid PIN verification by a mobile station with a first subscriber identity card and a second subscriber identity card according to another embodiment of the invention.

Accompanying with the flow chart as shown in FIG. 6 and the look-up table as shown in FIG. 7, FIG. 8 shows a flow chart illustrating a method for performing a hybrid PIN verification by a mobile station with a first subscriber identity card and a second subscriber identity card, being performed when executing software/firmware code by a processor of the mobile station (e.g. 220A or 220B of FIG. 2A, or 320 of FIG. 2B), according to another embodiment of the invention. First, it is determined whether the single PIN verification has been enabled (step S802). If not, the normal PIN verification procedure shown in FIG. 3 is subsequently performed (step S804). If so, a single PIN verification procedure is performed. Next, in step S806, the single PIN verification procedure begins to determine whether any of subscriber identity cards has been removed from the mobile station since the last single PIN verification. The mobile station may acquire ICCIDs of the currently inserted subscriber identity cards and inspect whether the acquired ICCIDs are recorded in the mapping information. It is determined that a subscriber identity card has been removed from the mobile station when any of the acquired ICCID is not recorded in the mapping information. If so, the process proceeds to perform a normal PIN verification procedure as shown in FIG. 3 (step S818), otherwise, a common PIN verification procedure is performed (some of steps S808 to S816).

In step S808, the common PIN verification procedure begins to prompt a user to enter a PIN code for authentication. Next, it is determined whether the inputted PIN code is correct (step S810). If the inputted PIN code is correct, that is, the inputted PIN code is the same as the stored common PIN code, the mobile station further examines whether the stored PIN codes are the same as that of the currently inserted subscriber identity cards. If so, a verification result indicating that the first and second subscriber identity cards have been successfully verified is stored (step S812). Simultaneously, a number of remaining PIN attempts for the first and second subscriber identity cards is reset to their initial values, for example 3, which represents the maximum of unsuccessful attempts. Note that, the initial value may be configured to a greater or smaller number according to system requirements. If the provided common PIN code is false, the number of remaining PIN attempts for the first and second subscriber identity cards is decremented. It is to be understood that the number of remaining PIN attempts may be stored in a non-volatile storage device or the first or second subscriber identity card of the mobile station. Next, it is determined whether the number of remaining PIN attempts has reached a predefined number, for example zero (step S814). If so (for example, after 3 consecutive false common PIN attempts), a verification result indicating that the first and second subscriber identity cards have been blocked is stored (step S816), wherein any of the first and second subscriber identity cards is blocked until the corresponding UNBLOCK PIN function is successfully performed.

Alternately, after successfully performing the normal PIN verification procedure (step S818), a new common PIN code may be input by the user and is stored in a non-volatile storage device of the mobile station to replace the old one (step S820). Subsequently, for each currently inserted subscriber identity card, the mapping information regarding a relationship between the printed ICCID and the PIN code thereof is stored to replace the old one (step S822).

Figure 9:
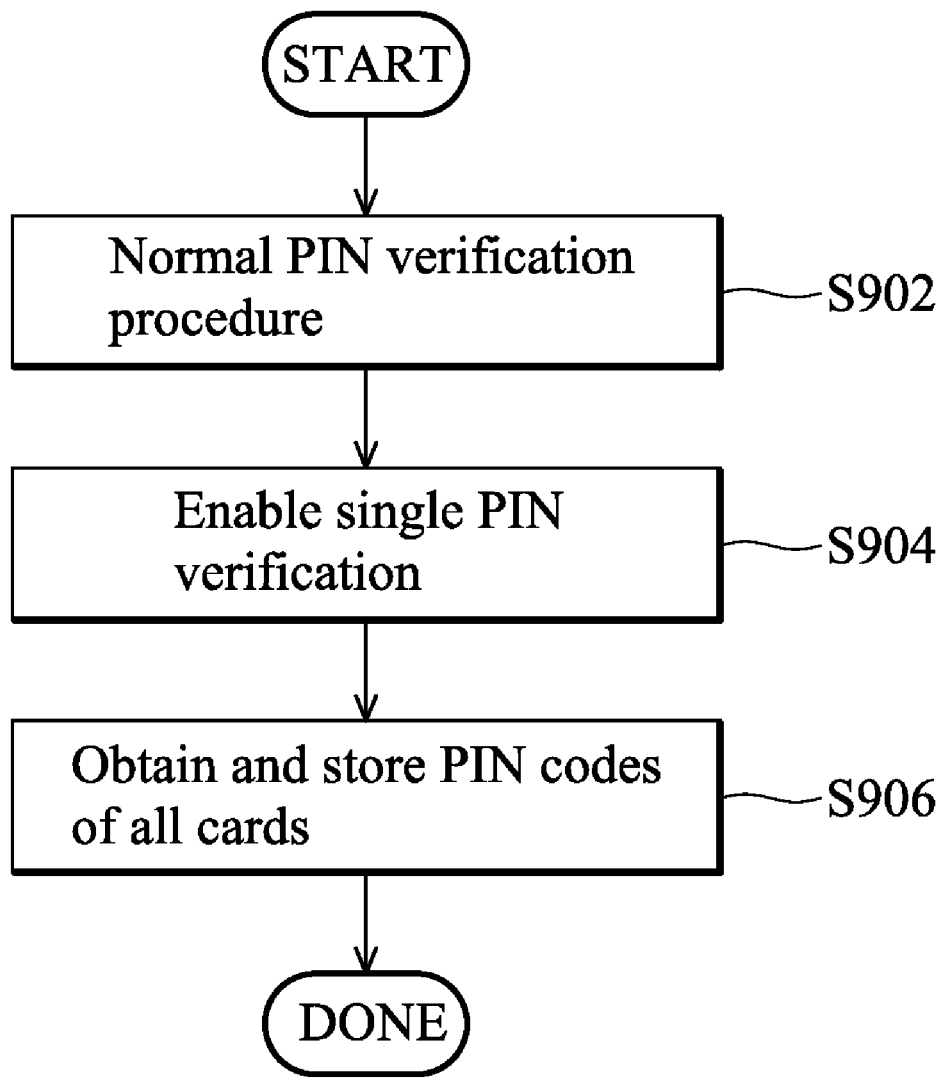
FIG. 9 shows a flow chart illustrating a method for enabling a single PIN verification according to another embodiment of the invention.

In order to reduce verification time and power consumption, still another embodiment of the invention may be introduced to pick up one subscriber identity card to be verified according to a preset rule, instead of separately verifying all inserted subscriber identity cards using two or more PIN verification loops with excessive user interactions, as shown in FIG. 3. FIG. 9 shows a flow chart illustrating a method for enabling a single PIN verification according to still another embodiment of the invention. After successfully passing the normal PIN verification procedure as shown in FIG. 3 (step S902), a user may enable the single PIN verification (step S904), and the PIN codes of all subscriber identity cards are obtained and stored in a non-volatile storage device of the mobile station when the single PIN verification is enabled (step S906). Such enabling of the single PIN verification and inputting of the PIN codes may be achieved during interactions with an MMI by the user.

Figure 10:
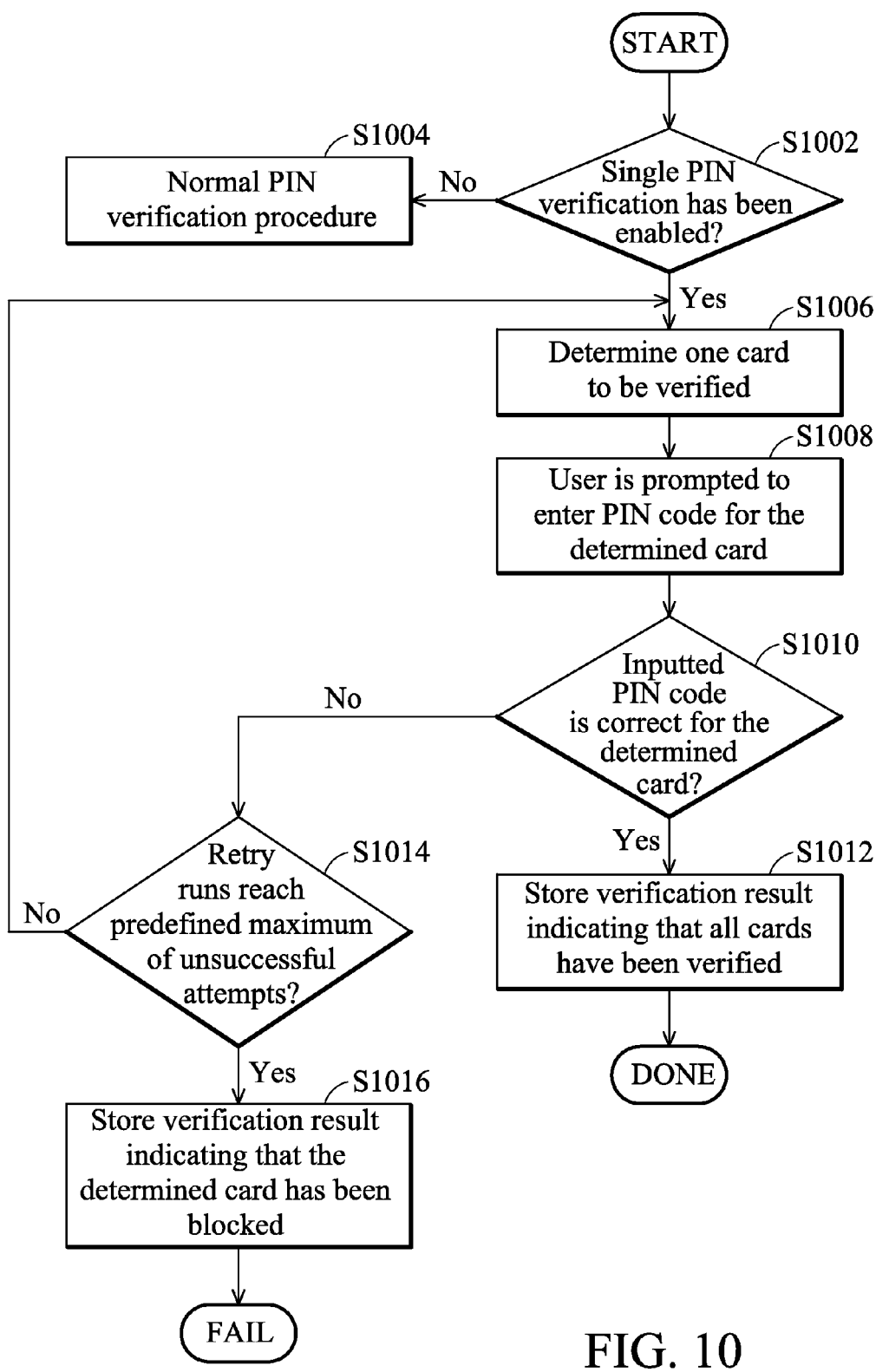
FIG. 10 shows a flow chart illustrating a method for performing a hybrid PIN verification by a mobile station with a first subscriber identity card and a second subscriber identity card according to another embodiment of the invention.

Accompanying with the flow chart as shown in FIG. 9, FIG. 10 shows a flow chart illustrating a method for performing a hybrid PIN verification by a mobile station with a first subscriber identity card and a second subscriber identity card, being performed when executing software/firmware code by a processor of the mobile station (e.g. 220A or 220B of FIG. 2A, or 320 of FIG. 2B), according to still another embodiment of the invention. First, it is determined whether the single PIN verification has been enabled (step S1002). If not, the normal PIN verification procedure shown in FIG. 3 is subsequently performed (step S1004). If so, a single PIN verification procedure is performed. The single PIN verification procedure begins to determine one of the first and second subscriber identity cards to be verified according a specific rule (step S1006). The specific rule may indicate that one of the subscriber identity cards is randomly or alternately determined, or the subscriber identity card preset by user is always determined. Next, the single PIN verification procedure may prompt a user to enter a PIN code for the determined subscriber identity card (step S1008). Next, in step S1010, it is determined whether the inputted PIN code is correct for the determined subscriber identity card, and if so, the single PIN verification procedure may automatically verify the other subscriber identity card with the stored PIN code thereof for the user. Next, a verification result indicating that the first and second subscriber identity cards have been successfully verified is stored (step S1012). Simultaneously, a number of remaining PIN attempts for the selected subscriber identity card is reset to its initial values, for example 3, which represents the maximum of unsuccessful attempts. Note that, the initial value may be configured to a greater or smaller number according to system requirements. If the provided PIN code is false, the number of remaining PIN attempts for the selected subscriber identity card is decremented by one. It is to be understood that the number of remaining PIN attempts may be stored in a non-volatile storage device or the first or second subscriber identity cards of the mobile station. Next, it is determined whether the number of remaining PIN attempts has reached a predefined number, for example zero (step S1014). If so (for example, after 3 consecutive false PIN attempts), a verification result indicating that the determined subscriber identity card has been blocked is stored (step S1016), wherein the determined subscriber identity card is blocked until the UNBLOCK PIN function is successfully performed.

Figure 11:
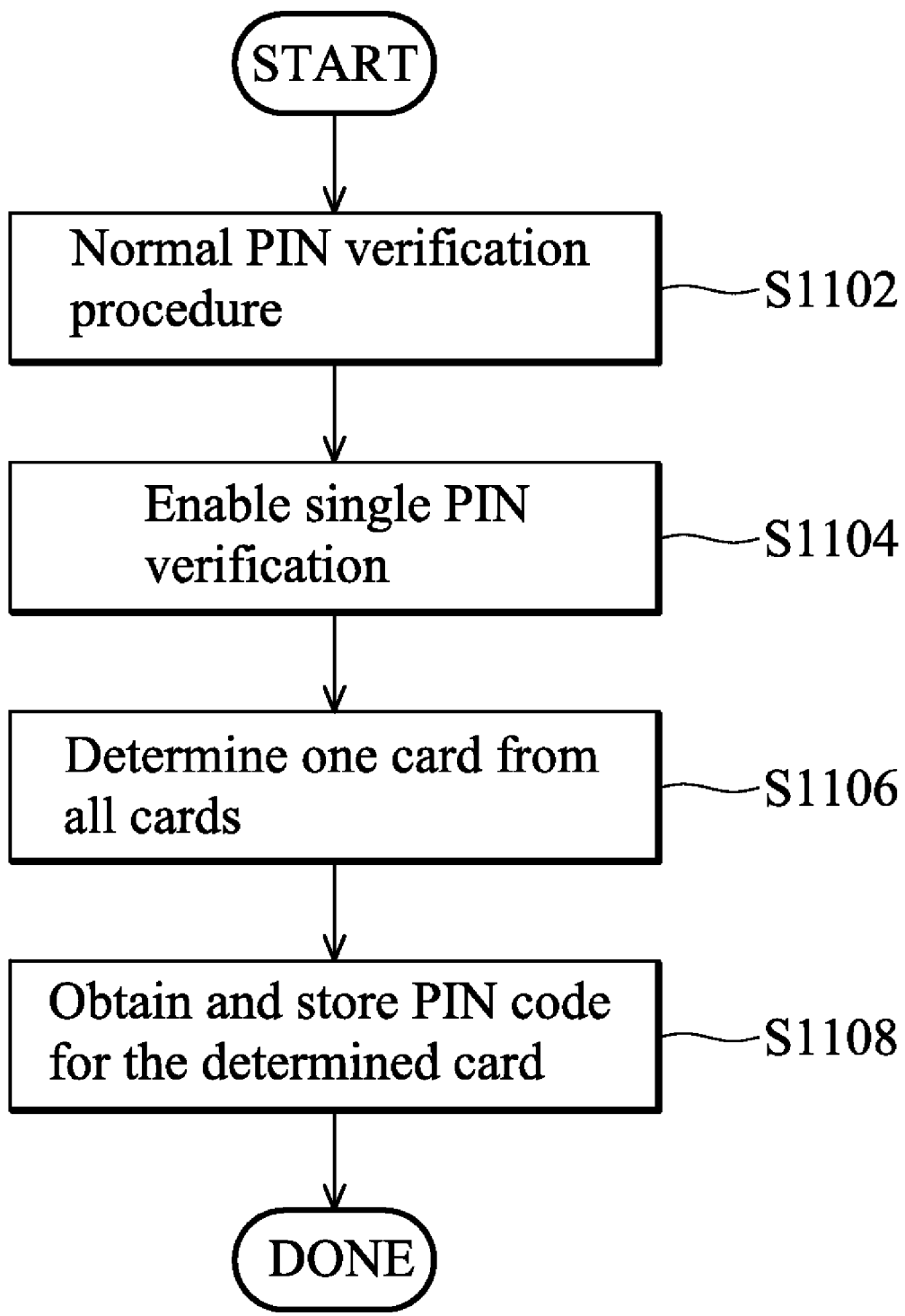
FIG. 11 shows a flow chart illustrating a method for enabling a single PIN verification according to another embodiment of the invention.

FIG. 11 shows a flow chart illustrating a method for enabling a single PIN verification according to still another embodiment of the invention. After successfully passing the normal PIN verification procedure shown in FIG. 3 (step S1102), a user may enable the single PIN verification (step S1104). After that, one of the first and second subscriber identity cards is determined according to a specific rule (step S1106) and then a PIN code of the determined subscriber identity card is obtained and stored in a non-volatile storage device of the mobile station (step S1108). The specific rule may indicate that one of the subscriber identity cards is randomly or alternately determined, or the preferred subscriber identity card set by user is always determined. Such enabling of the single PIN verification and inputting of the PIN code may be achieved during interaction with an MMI by the user. The MMI may force the user to type the PIN code twice to prevent mistyping.

Figure 12:
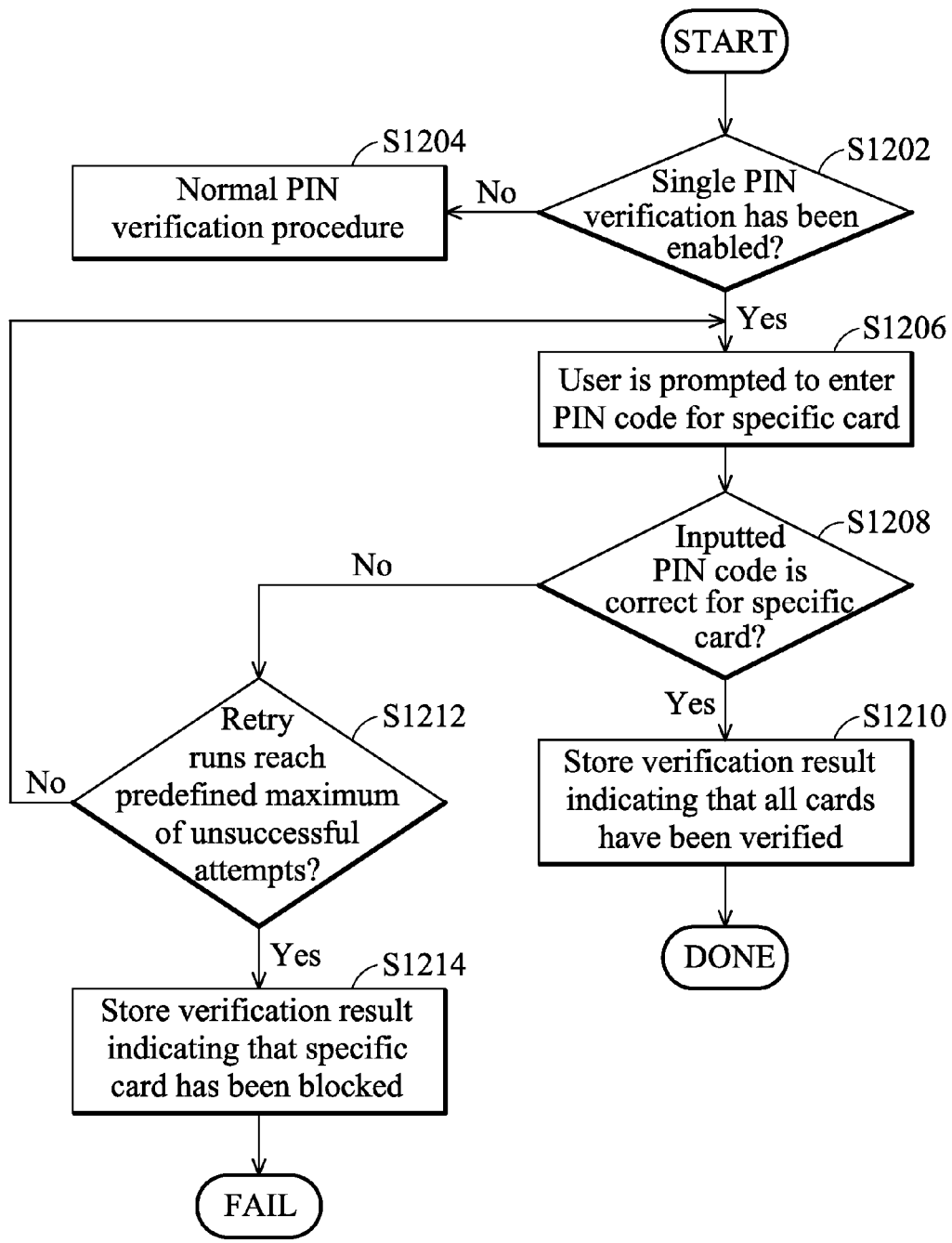
FIG. 12 shows a flow chart illustrating a method for performing a hybrid PIN verification by a mobile station with a first subscriber identity card and a second subscriber identity card according to another embodiment of the invention.

Accompanying with the flow chart as shown in FIG. 11, FIG. 12 shows a flow chart illustrating a method for performing a hybrid PIN verification by a mobile station with a first subscriber identity card and a second subscriber identity card, being performed when executing software/firmware code by a processor of the mobile station (e.g. 220A or 220B of FIG. 2A, or 320 of FIG. 2B), according to still another embodiment of the invention. First, it is determined whether the single PIN verification has been enabled (step S1202). If not, the normal PIN verification procedure shown in FIG. 3 is subsequently performed (step S1204). If so, a single PIN verification procedure is performed. In step S1206, the single PIN verification procedure begins to prompt a user to input a PIN code for a specific subscriber identity card, which is the subscriber identity card other than the determined subscriber identity card determined in step S1106 of FIG. 11. Next, in step S1208, it is determined whether the inputted PIN code is correct for the corresponding subscriber identity card, and then the mobile station may automatically verify the determined subscriber identity card with the stored PIN code when the input PIN code is correct. Next, a verification result indicating that the first and second subscriber identity cards have been successfully verified is stored (step S1210). Simultaneously, a number of remaining PIN attempts for the selected subscriber identity card is reset to its initial values, for example 3, which represents the maximum of unsuccessful attempts. Note that, the initial value may be configured to a greater or smaller number according to system requirements. If the provided PIN code is false, the number of remaining PIN attempts for the specific subscriber identity card is decremented by one. It is to be understood that the number of remaining PIN attempts may be stored in a non-volatile storage device or the first or second subscriber identity cards of the mobile station. Next, it is determined whether the number of remaining PIN attempts has reached a predefined number, for example zero (step S1212). If so (for example, after 3 consecutive false PIN attempts), a verification result indicating that the corresponding subscriber identity card has been blocked is stored (step S1214), wherein the corresponding subscriber identity card is blocked until the UNBLOCK PIN function is successfully performed.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for performing personal identification number (PIN) verification by a mobile station with a first subscriber identity card and a second subscriber identity card, performed by a processor of the mobile station, comprising:

obtaining a common code;

replacing an originally stored first personal identification number code of the first subscriber identity card and an originally stored second personal identification number code of the second subscriber identity card with the common code;

receiving a single input code;

verifying the first subscriber identity card and the second subscriber identity card according to the input code, in which both the first and second subscriber identity cards store the common code; and storing a first result which indicates that the first subscriber identity card and the second subscriber identity card have been successfully verified when the input code is correct.

2. The method as claimed in claim 1, further comprising:

storing a second result which indicates that the first subscriber identity card and the second subscriber identity card have been blocked when the input code is incorrect.

3. The method as claimed in claim 1, wherein the input code is entered via man-machine interface (MMI).

4. The method as claimed in claim 1, wherein the step of verifying the first and second subscriber identity cards further comprises:

inspecting whether the input code is identical to the replaced first personal identification number code and the replaced second personal identification number, wherein the first subscriber identity card and the second subscriber identity card are successfully verified when the input code is identical to the replaced first personal identification number code and the replaced second personal identification number.

5. A method for performing personal identification number (PIN) verification by a mobile station with a first subscriber identity card and a second subscriber identity card, performed by a processor of the mobile station, comprising:

obtaining a common code;

storing the common code and mapping information regarding a first integrated circuit card identity (ICCID) associated with a first personal identification number code of the first subscriber identity card and a second ICCID associated with a second personal identification number code of the second subscriber identity card;

receiving a single input code;

determining whether any of the first subscriber identity card and the second subscriber identity cards has been removed from the mobile station;

inspecting whether the input code is identical to the stored common code when none of the first subscriber identity card and the second subscriber identity card has been removed from the mobile station;

verifying the first subscriber identity card using the first personal identification number code recorded in the mapping information when the input code is identical to the stored common code;

verifying the second subscriber identity card using the second personal identification number code recorded in the mapping information when the input code is identical to the stored common code; and storing a first result which indicates that the first subscriber identity card and the second subscriber identity card have been successfully verified when the verification to the first and second subscriber identity cards are both successful.

6. The method as claimed in claim 5, wherein the step of determining whether any of the first subscriber identity card and the second subscriber identity card has been removed further comprises:

obtaining a third ICCID and a fourth ICCID from the subscriber identity cards currently inserted into the mobile station;

inspecting whether the obtained third and fourth ICCIDs are identical to the first and second ICCIDs recorded in the mapping information; and determining that none of the first subscriber identity card and the second subscriber identity card has been removed from the mobile station when the obtained third and fourth ICCIDs are identical to the first and second ICCIDs recorded in the mapping information.

7. A method for performing personal identification number (PIN) verification by a mobile station with a first subscriber identity card and a second subscriber identity card, performed by a processor of the mobile station, comprising:

obtaining and storing a personal identification number code of the first subscriber identity card and a personal identification number code of the second subscriber identity card;

determining one subscriber identity card from the first subscriber identity card and the second subscriber identity card according to a specific rule, wherein the specific rule indicates that one of the subscriber identity cards is randomly or alternately determined, or one subscriber identity card preset by user is determined;

receiving a single input code;

verifying the first subscriber identity card and the second subscriber identity card according to the input code; and storing a first result which indicates that the first subscriber identity card and the second subscriber identity card have been successfully verified when the input code is correct.

8. The method as claimed in claim 7, wherein the step of verifying the first and second subscriber identity cards further comprises:

inspecting whether the input code is identical to the stored personal identification number code of the determined subscriber identity card; and verifying the subscriber identity card other than the determined subscriber identity card using the stored personal identification number code of the other subscriber identity card when the input code is identical to the stored personal identification number code of the determined subscriber identity card.

9. The method as claimed in claim 7, wherein the step of verifying further comprises:

inspecting whether the input code is identical to the subscriber identity card other than the determined subscriber identity card; and verifying the determined subscriber identity card using the stored personal identification number code when the other subscriber identity card has been successfully verified.

10. A system accompanying with a first subscriber identity card and a second subscriber identity card for performing PIN verification, comprising:
 processor logic for obtaining a common code;
 processor logic for replacing an originally stored first personal identification number code of the first subscriber identity card and an originally stored second personal identification number code of the second subscriber identity card with the common code;
 processor logic for receiving a single input code;
 processor logic for verifying the first subscriber identity card and the second subscriber identity card according to the input code, in which both the first and second subscriber identity cards store the common code; and
 processor logic for storing a first result which indicates that the first subscriber identity card and the second subscriber identity card have been successfully verified when the input code is correct.

11. The system as claimed in claim 10, further comprising:
 processor logic for storing a second result which indicates that the first subscriber identity card and the second subscriber identity card have been blocked when the input code is incorrect.

12. The system as claimed in claim 10, further comprising:
 processor logic for obtaining a common personal identification number code instead of originally stored personal identification number codes for the first and second subscriber identity cards;
 processor logic for inspecting whether the input code is identical to the common personal identification number code; and
 processor logic for determining that the first and second subscriber identity cards are successfully verified when the input code is identical to the common personal identification number code.

13. A system accompanying with a first subscriber identity card and a second subscriber identity card for performing PIN verification, comprising:
 a non-volatile storage device;
 processor logic for obtaining a common code;
 processor logic for storing the common code and mapping information regarding a first integrated circuit card identity (ICCID) associated with a first personal identification number code of the first subscriber identity card and a second ICCID associated with a second personal identification number code of the second subscriber identity card in the non-volatile storage device before the receiving of the input code;
 processor logic for receiving a single input code;
 processor logic for determining whether any of the first subscriber identity card and the second subscriber identity cards has been removed from the mobile station;
 processor logic for inspecting whether the input code is identical to the stored common code when none of the first subscriber identity card and the second subscriber identity card has been removed from the mobile station;
 processor logic for verifying the first subscriber identity card using the first personal identification number code recorded in the mapping information when the input code is identical to the stored common code;
 processor logic for verifying the second subscriber identity card using the second personal identification number code recorded in the mapping information when the input code is identical to the stored common code; and
 processor logic for storing a first result which indicates that the first subscriber identity card and the second subscriber identity card have been successfully verified when the verification to the first and second subscriber identity cards are both successful.

14. A system accompanying with a first subscriber identity card and a second subscriber identity card for performing PIN verification, comprising:
 a non-volatile storage device;
 processor logic for obtaining and storing the personal identification number codes of the first and second subscriber identity cards in the non-volatile storage device before the receiving of the input code;
 processor logic for determining one subscriber identity card from the first and second subscriber identity cards according to a specific rule, wherein the specific rule indicates that one of the subscriber identity cards is randomly or alternately determined, or one subscriber identity card preset by user is determined;
 processor logic for receiving a single input code;
 processor logic for verifying the first subscriber identity card and the second subscriber identity card according to the input code; and
 processor logic for storing a first result which indicates that the first subscriber identity card and the second subscriber identity card have been successfully verified when the input code is correct.

15. The system as claimed in claim 14, further comprising:
 processor logic for inspecting whether the input code is identical to the stored personal identification number code of the determined subscriber identity card; and
 processor logic for verifying the subscriber identity card other than the determined subscriber identity card using the stored personal identification number code of the other subscriber identity card when the input code is identical to the stored personal identification number code of the determined subscriber identity card.

16. The system as claimed in claim 14, further comprising:
 processor logic for inspecting whether the input code is identical to the subscriber identity card other than the determined subscriber identity card; and
 processor logic for verifying the determined subscriber identity card using the stored personal identification number code when the other subscriber identity card has been successfully verified.

17. The system as claimed in claim 13, further comprising:
 processor logic for obtaining a third ICCID and a fourth ICCID from the subscriber identity cards currently inserted into the mobile station;
 processor logic for inspecting whether the obtained third and fourth ICCIDs are respectively identical to the first and second ICCIDs recorded in the mapping information; and
 processor logic for determining that none of the first subscriber identity card and the second subscriber identity card has been removed from the mobile station when the obtained third and fourth ICCIDs are identical to the first and second ICCIDs recorded in the mapping information.

* * * * *